(12) United States Patent
Fukumoto et al.

(10) Patent No.: US 7,865,192 B2
(45) Date of Patent: Jan. 4, 2011

(54) RADIO FREQUENCY SELECTION DEVICE, A RADIO COMMUNICATION SYSTEM AND RADIO CONTROL CHANNEL ESTABLISHING METHOD

(75) Inventors: Satoru Fukumoto, Yokosuka (JP); Masashige Shirakabe, Yokohama (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 348 days.

(21) Appl. No.: 11/150,266

(22) Filed: Jun. 13, 2005

(65) Prior Publication Data

US 2006/0009230 A1 Jan. 12, 2006

(30) Foreign Application Priority Data

Jun. 11, 2004 (JP) ............................. 2004-174739

(51) Int. Cl.
*H04W 72/00* (2009.01)

(52) U.S. Cl. .............. 455/452.2; 455/435.3; 455/552.1; 455/444; 455/512; 455/515

(58) Field of Classification Search ......... 455/445–454, 455/435.1–435.3, 552.1, 553.1, 444, 452.2, 455/509–515

See application file for complete search history.

(56) References Cited

U.S. PATENT DOCUMENTS

| | | | | |
|---|---|---|---|---|
| 4,573,206 A | * | 2/1986 | Grauel et al. ............... | 455/453 |
| 4,633,509 A | | 12/1986 | Scheinert | |
| 4,850,033 A | * | 7/1989 | Eizenhofer et al. .......... | 455/450 |
| 5,093,924 A | * | 3/1992 | Toshiyuki et al. ........... | 455/450 |
| 5,533,008 A | * | 7/1996 | Grube et al. ................ | 370/252 |
| 5,666,655 A | * | 9/1997 | Ishikawa et al. ............ | 455/512 |
| 5,732,353 A | * | 3/1998 | Haartsen .................... | 455/450 |
| 5,778,318 A | * | 7/1998 | Talarmo et al. ........... | 455/452.1 |
| 5,805,633 A | * | 9/1998 | Uddenfeldt ................. | 375/133 |
| 5,987,324 A | | 11/1999 | Peranto et al. | |
| 6,047,187 A | * | 4/2000 | Haartsen .................... | 455/450 |
| 6,097,961 A | * | 8/2000 | Alanara et al. ............. | 455/466 |

(Continued)

FOREIGN PATENT DOCUMENTS

CN 1200864 A 12/1998

(Continued)

OTHER PUBLICATIONS

Roland Heickero, et al., "Ericsson seamless network", Ericsson Review, No. 2, 2002, pp. 76-83.

(Continued)

*Primary Examiner*—Edward Urban
*Assistant Examiner*—RuiMeng Hu
(74) *Attorney, Agent, or Firm*—Oblon, Spivak, McClelland, Maier & Neustadt, L.L.P.

(57) ABSTRACT

A radio frequency selection device in a radio communication system in which a radio communication channel is established between a mobile station and a base station by allocating a radio communication frequency band different from other radio communication system frequency bands is disclosed. The radio frequency selection device comprises: a frequency band determining unit that determines a radio control channel frequency band for transmitting control information, among frequency bands allocated to the radio communication system, based on the allocated radio communication channel frequency band; and a radio control channel establishing unit that establishes a radio control channel among the determined radio control channel frequency bands.

8 Claims, 19 Drawing Sheets

U.S. PATENT DOCUMENTS

| | | | |
|---|---|---|---|
| 6,108,541 A * | 8/2000 | Yazaki et al. | 455/434 |
| 6,167,285 A * | 12/2000 | Howe | 455/552.1 |
| 6,185,422 B1 * | 2/2001 | Mattila | 455/434 |
| 6,229,996 B1 * | 5/2001 | Uistola | 455/168.1 |
| 6,400,704 B2 * | 6/2002 | Mikuni et al. | 370/347 |
| 6,497,599 B1 * | 12/2002 | Johnson et al. | 455/447 |
| 2001/0036837 A1 * | 11/2001 | Uistola | 455/552 |
| 2003/0045282 A1 * | 3/2003 | Yamaguchi et al. | 455/424 |
| 2004/0005897 A1 * | 1/2004 | Tomoe et al. | 455/450 |
| 2004/0005898 A1 * | 1/2004 | Kato et al. | 455/450 |
| 2004/0203734 A1 * | 10/2004 | Ishii | 455/426.1 |
| 2004/0203967 A1 * | 10/2004 | Yamaguchi et al. | 455/509 |
| 2004/0224719 A1 * | 11/2004 | Nounin et al. | 455/553.1 |
| 2005/0037770 A1 * | 2/2005 | Takeda et al. | 455/453 |
| 2005/0148336 A1 * | 7/2005 | Nagato et al. | 455/450 |
| 2005/0197134 A1 * | 9/2005 | McKenna et al. | 455/452.1 |
| 2005/0282550 A1 * | 12/2005 | Cho et al. | 455/447 |
| 2006/0068803 A1 * | 3/2006 | Kajimoto | 455/452.2 |

FOREIGN PATENT DOCUMENTS

| | | |
|---|---|---|
| EP | 1 482 753 A2 | 12/2004 |
| JP | 2002-509583 | 3/2002 |
| JP | 2003-143651 | 5/2003 |
| JP | 2004-159370 | 6/2004 |
| JP | 2005-510152 | 4/2005 |
| WO | WO 96/31991 | 10/1996 |
| WO | WO 97/09838 | 3/1997 |
| WO | WO 03/043355 A1 | 5/2003 |

OTHER PUBLICATIONS

Ikeshita, et al., "1.55GHz/800MHz dual band system", NTT DoCoMo Technical Journal, vol. 10, No. 1, Apr. 2003, pp. 6-14 (with partial English translation).

Gang Wu, et al., "MIRAI Architecture for Heterogeneous Network", IEEE Communications Magazine, No. 2, Feb. 2002, pp. 126-134.

* cited by examiner

FIG.2

| FREQUENCY BAND | LOW | HIGH |
|---|---|---|
| PROPAGATION LOSS | SMALL | LARGE |
| BUILDING PENETRATION LOSS | SMALL | LARGE |
| DOPPLER VARIATION AGAINST MOVING SPEED | SLOW | FAST |
| SECURABLE BANDWIDTH | NARROW | BROAD |

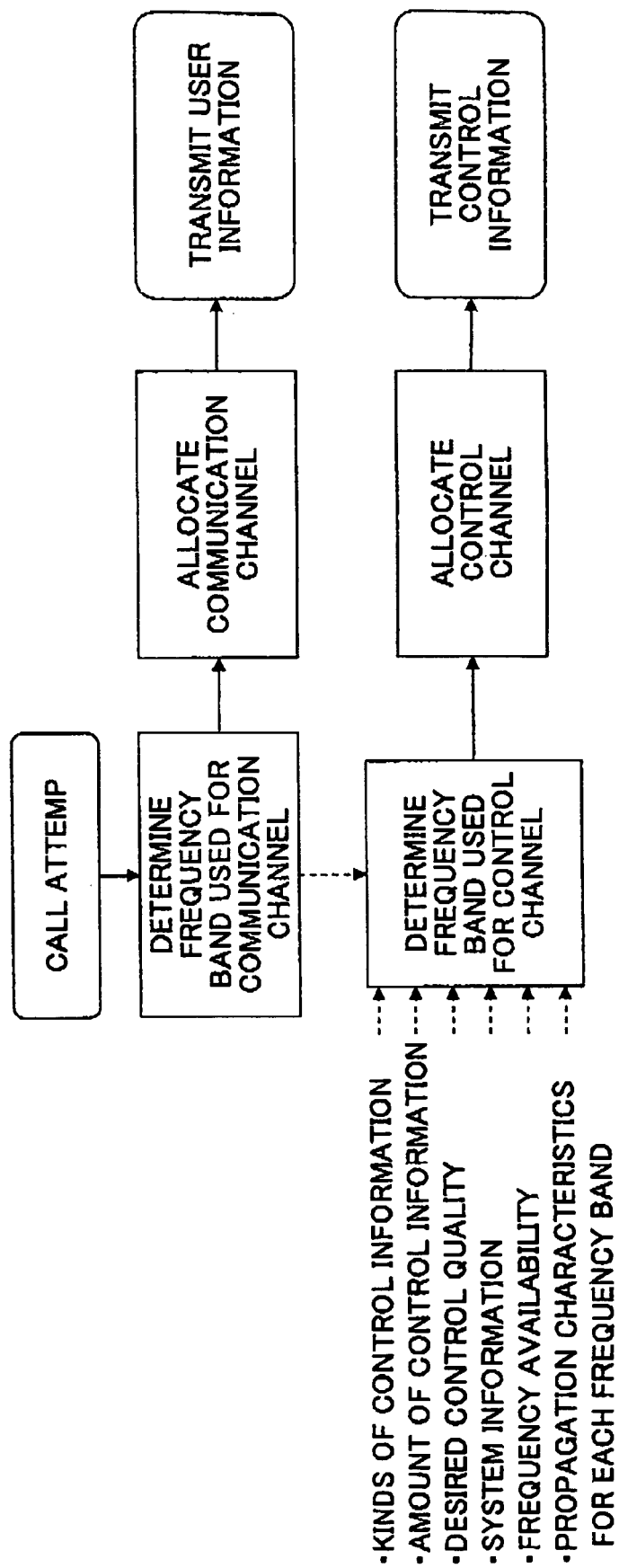

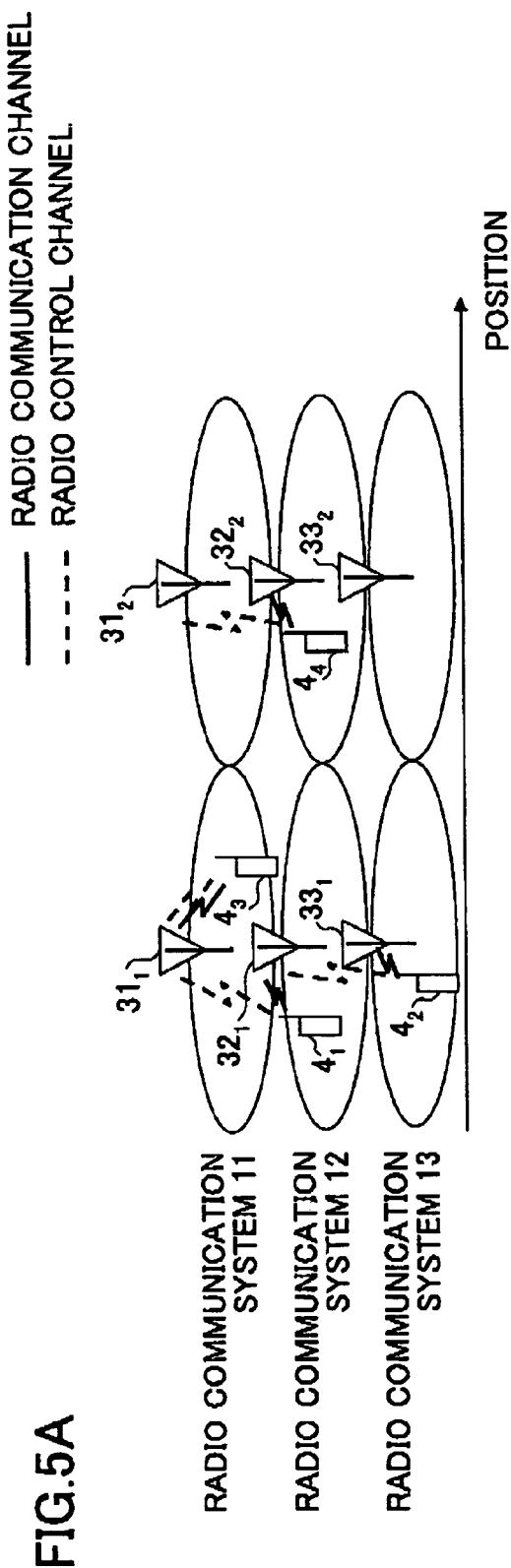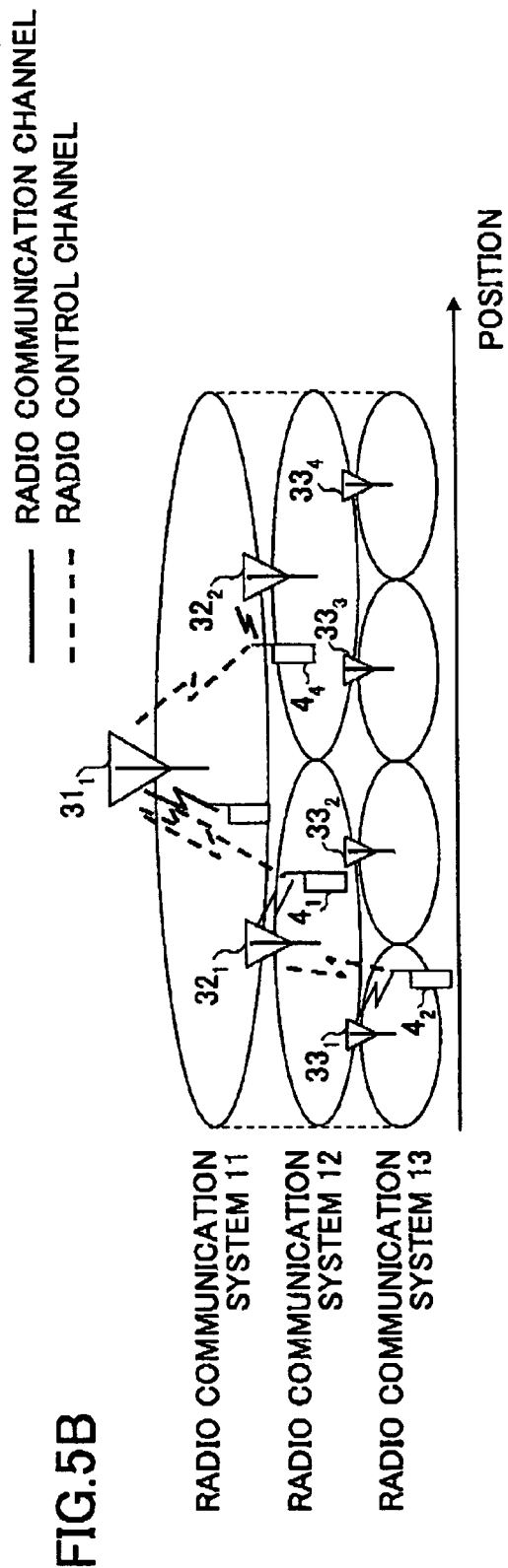

FIG.7

| FREQUENCY BAND FOR RADIO COMMUNICATION CHANNEL | $f_1$ | $f_2$ | $f_3$ |
|---|---|---|---|
| FREQUENCY BAND CANDIDATE FOR RADIO CONTROL CHANNEL | $f_1$ | $f_1, f_2$ | $f_1, f_2, f_3$ |

$f_1$ : SYSTEM FREQUENCY BAND 21
$f_2$ : SYSTEM FREQUENCY BAND 22
$f_3$ : SYSTEM FREQUENCY BAND 23
($f_1 < f_2 < f_3$)

FIG.8

| FREQUENCY BAND FOR RADIO COMMUNICATION CHANNEL | $f_1$ | $f_2$ | $f_3$ |
|---|---|---|---|
| FREQUENCY BAND CANDIDATE FOR RADIO CONTROL CHANNEL | $f_1$ | $f_1$ | $f_2$ |

$f_1$ : SYSTEM FREQUENCY BAND 21
$f_2$ : SYSTEM FREQUENCY BAND 22
$f_3$ : SYSTEM FREQUENCY BAND 23
($f_1 < f_2 < f_3$)

FIG.10

| CONTROL SUBJECT | REQUIRED CONDITION |
|---|---|
| QUALITY CONTROL OF COMMUNICATION CHANNEL IN PHYSICAL LAYER (SUCH AS TRANSMISSION POWER CONTROL) | SMALL CONTROL-DELAY IS REQUIRED FOR REALIZING HIGH SPEED CONTROL CAPABLE OF FOLLOWING INSTANTANEOUS RECEPTION POWER VARIATION |
| QUALITY CONTROL OF COMMUNICATION CHANNEL IN PHYSICAL LAYER (SUCH AS HAND-OVER POWER CONTROL) | REDUCTIONS IN CONTROL-DELAY AND TRANSMISSION QUALITY DEGRADATION ARE REQUIRED FOR REALIZING HIGH ACCURACY CONTROL CAPABLE OF FOLLOWING SLOW RECEPTION POWER VARIATION |
| CALL CONTROL IN PHYSICAL LAYER | REDUCTION IN TRANSMISSION QUALITY DEGRADATION IS REQUIRED FOR IMPROVING USER INFORMATION QUALITY |

FIG.11

| CONTROL FACTOR | FREQUENCY BAND SUITABLE FOR ESTABLISHING CONTROL CHANNEL | | |
|---|---|---|---|
| | LOW FREQUENCY BAND AMONG FREQUENCY BAND CANDIDATES LOWER THAN COMMUNICATION CHANNEL FREQUENCY BAND | HIGH FREQUENCY BAND AMONG FREQUENCY BAND CANDIDATES LOWER THAN COMMUNICATION CHANNEL FREQUENCY BAND | FREQUENCY BAND SAME AS COMMUNICATION CHANNEL FREQUENCY BAND |
| AMOUNT OF CONTROL INFORMATION | SMALL | LARGE | LARGE |
| QUALITY REQUIRED FOR CONTROL INFORMATION | HIGH | HIGH | LOW |
| TOLERABLE CONTROL DELAY | LARGE | LARGE | SMALL |
| CONDITION REQUIRED FOR COVERAGE (PROPAGATION LOSS, BUILDING PENETRATION LOSS) | BROAD | NARROW | BROAD |

FIG.12

| FREQUENCY BAND FOR DOWNLINK RADIO COMMUNICATION CHANNEL | $f_1$ | $f_2$ | $f_3$ |
|---|---|---|---|
| FREQUENCY BAND CANDIDATE FOR UPLINK RADIO CONTROL CHANNEL | $f_1$ | $f_1, f_2$ | $f_1, f_2, f_3$ |

$f_1$ : SYSTEM FREQUENCY BAND 21
$f_2$ : SYSTEM FREQUENCY BAND 22
$f_3$ : SYSTEM FREQUENCY BAND 23
($f_1 < f_2 < f_3$)

RADIO FREQUENCY SELECTION DEVICE, A RADIO COMMUNICATION SYSTEM AND RADIO CONTROL CHANNEL ESTABLISHING METHOD

BACKGROUND OF THE INVENTION

The present invention generally relates to a radio frequency selection device in a radio communication system in which a radio communication channel is established between a mobile station and a base station by allocating a radio communication frequency band different from other radio communication system frequency bands, specifically relates to such a radio frequency selection device, a radio communication system and a radio control channel establishing method that can realize high quality transmission of the control information, highly accurate control and effective use of frequency resources.

Recently, demands for mobile communication services are rapidly increasing, and it is desired to realize high speed and large capacity communication services such as motion video or high speed data transfer, as well as conventional audio or low speed data transfer. Accordingly, in future mobile communication services, broad frequency bands should be secured to support low speed data communication to high speed and large capacity data communication.

However, frequency resources are limited and it is difficult to secure broad frequency bands, and therefore it is desired to provide communication methods capable of utilizing frequencies effectively. Radio communication systems have been already developed in a variety of ways, and users can receive a variety of services. However there is a problem in that service areas are not secured well enough when a new system is introduced, as when a new radio communication system is proposed and commercially utilized, in which plural different frequency bands are used for the effective use of frequency and broad service areas (See Non-Patent Document No. 1).

In the PDC (Personal Digital Cellular) system, for example, both bands of 800 MHz and 1.5 GHz are used (See Non-Patent Document No. 2). Mobile stations and base stations in this PDC system can utilize radio channels belonging to 800 MHz band or 1.5 GHz band. In this method, during a waiting mode or an audio communication operation mode, a frequency channel is allocated from candidates belonging to any band of 800 MHz or 1.5 GHz. In this manner, it is possible to shift to the 1.5 GHz band from the 800 MHz band in which traffic is extremely congested. A frequency band used for waiting by a mobile station is selected among these two bands, based on band transfer probability reported by the network. With respect to audio communication operations, the mobile station measures radio wave conditions of both frequency bands to secure available frequencies, and selects an adequate frequency band that could satisfy a desired quality and maintain the communications.

Non-Patent Document No. 3 proposes a network structure and a control method that integrates each system seamlessly in case where plural different radio communication systems are established in the same area. In this network structure, different radio communication systems and base stations belonging thereto are constructed independently in accordance with each environment. Mobile stations can be connected to any of the systems, and can establish basic access network for transmitting control signal among the systems.

By controlling plural communication channels, it becomes possible to utilize frequency resources effectively, secure service areas and improve throughput.

[Non-Patent Document No. 1]
R. Heichkero, et al., "Ericsson Seamless Network, "Ericsson Review, No. 2, pp. 76-83, 2002.

[Non-Patent Document No. 2]
"1.5 GHz band common usage. System Summary" by Ikeshita, Fukazawa and Masuda, NTT DoCoMo Technical Journal, Vol. 10, No. 1, pp. 6-14, April, 2003.

"MIRAI Architecture for Heterogeneous Network," by G. Wu, et al., IEEE Communication Magazine, No. 2, pp. 126-134, February 2002.

However, the above explained related art examples have the following problems.

Although the above systems can integrally manage radio channels for transmitting control signal, it is necessary to construct a new base access networking addition to the already existing radio channels. It is also necessary to prepare enough line capacity for transferring control information.

It is difficult to secure an adequate radio control channel for each system in consideration of required control information amount. Generally, as the frequency band becomes higher, available signal bandwidth becomes broader and a user information transmission amount becomes larger. In this situation, an amount of control information necessary for maintaining communication is expected to become larger as the user information transmission amount. However, in the basic access network, it is difficult to flexibly secure radio control channels in accordance with the varied control information transmission amount.

In the above prior examples, the control is performed based on measured results of received signals, but frequency characteristics of radio transmission signals are not considered.

When establishing radio control channels using different frequency bands, differences in information amounts between the user information and the control information, and coverage area to which the control information is transmitted are not considered. In practice, it is necessary to consider propagation characteristics in the real environment, fading effect, difference in securable frequency bandwidth, information amount difference between the user information and the control information, quality required for the control information and coverage area to which the control information is transmitted.

SUMMARY OF THE INVENTION

A general object of the present invention is to provide a radio frequency selection device, a radio communication system and a radio control channel establishing method that can establish radio control channels in consideration of characteristics of each frequency band.

The above object of the present invention is achieved by a radio frequency selection device in a radio communication system in which a radio communication channel is established between a mobile station and a base station by allocating a radio communication frequency band different from other radio communication system frequency bands, characterized by: a frequency band determining unit that determines a radio control channel frequency band for transmitting control information, among frequency bands allocated to the radio communication system, based on the allocated radio communication channel frequency band; and a radio control channel establishing unit that establishes a radio control channel among the determined radio control channel frequency bands.

According to another feature of the present invention, a radio communication system in which a radio communication channel is established between a mobile station and a base station by allocating a radio communication frequency band different from other radio communication system frequency bands is provided, which is characterized by: a frequency band determining unit that determines a radio control channel frequency band for transmitting control information, among frequency bands allocated to the radio communication system, based on the allocated radio communication channel frequency band; and a radio control channel establishing unit that establishes a radio control channel among the determined radio control channel frequency bands.

According to another feature of the present invention, a radio control channel establishing method in a radio communication system in which a radio communication channel is established between a mobile station and a base station by allocating a radio communication frequency band different from other radio communication system frequency bands is provided, which is characterized by the steps of: determining a radio communication channel between the mobile station and the base station; determining a radio control channel frequency band for transmitting control information, among frequency bands allocated to the radio communication system, based on the allocated radio communication channel frequency band; and establishing a radio control channel among the determined radio control channel frequency band.

BRIEF DESCRIPTION OF THE DRAWINGS

FIG. 2 is an explanatory chart showing characteristic differences between high and low frequency bands;

FIG. 4 is an explanatory chart showing a multi-band mobile communication system according to one embodiment of the present invention;

FIGS. 5A and 5B are schematic views illustrating cell structures of multi-band mobile communication systems according to one embodiment of the present invention;

FIG. 7 is a graph explaining frequency band candidates in a multi-band control method according to one embodiment of the present invention;

FIG. 8 is a graph explaining frequency band candidates in a multi-band control method according to one embodiment of the present invention;

FIG. 10 is an explanatory graph explaining classification by control subject used in the multi-band control method in the multi-band mobile communication system according to one embodiment of the present invention;

FIG. 11 is an explanatory graph explaining a frequency determination rule used in the multi-band control method in the multi-band mobile communication system according to one embodiment of the present invention;

FIG. 12 is an explanatory graph explaining frequency determination examples in the multi-band control method in the multi-band mobile communication system according to one embodiment of the present invention;

DESCRIPTION OF THE PREFERRED EMBODIMENTS

Figure 1:
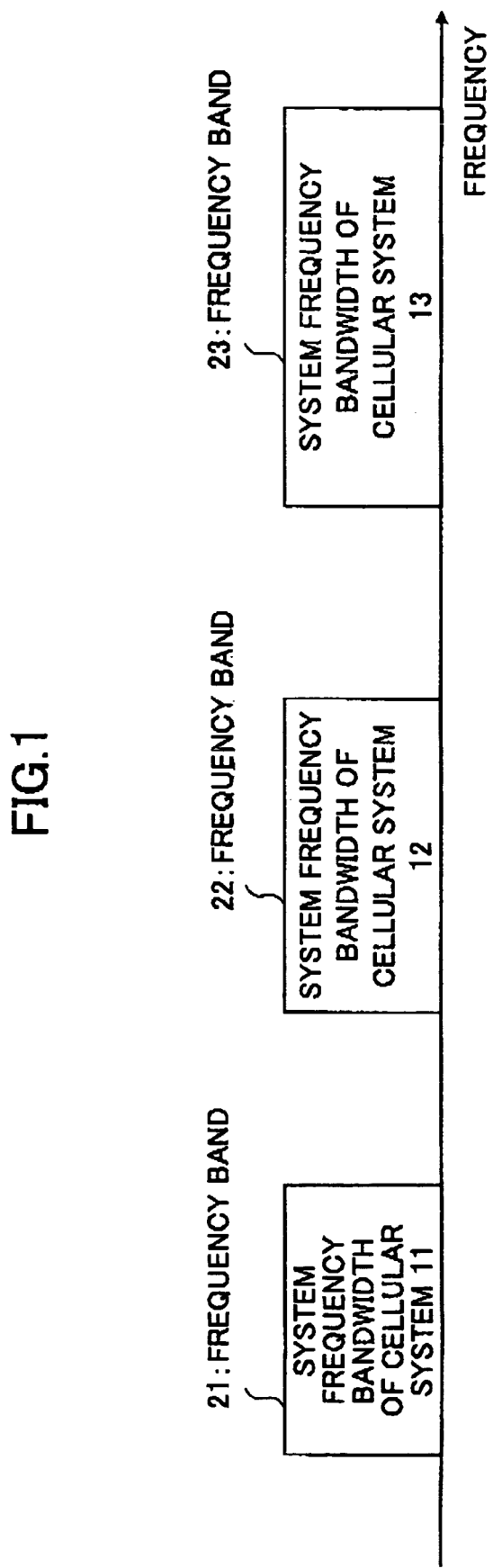
FIG. 1 is an explanatory chart showing system frequencies and their allocation in multi-cellular system to which the present invention is applicable.

The following is a description of embodiments of the present invention, with reference to the accompanying drawings.

Throughout all the figures, members and parts having the same or similar functions are assigned the same or similar reference numerals or symbols, and redundant explanations are omitted.

FIG. 1 shows an example of system frequency allocation to each cellular system in a multi-band mobile communication system, to which the present invention can be applied. The multi-band communication system utilizes a different frequency band for each of plural cellular systems.

In this embodiment, system frequencies are assigned to three cellular systems 11, 12 and 13 having the same communication system. These three systems are not overlapped in their frequency bands. Frequency band 21 is assigned as a system band for the cellular system 11. Frequency band 22 is assigned as a system band for the cellular system 12. Frequency band 23 is assigned as a system band for the cellular system 13.

Since the assigned frequency bands are different from each other, each cellular system has different propagation characteristics between mobile and base stations and has a different system frequency bandwidth (that is, capacity) securable to each system.

Differences in the propagation characteristics and in the system frequency bandwidths due to different frequency bands are explained with reference to FIG. 2.

Propagation loss between the mobile station and the base station varies depending on used frequency band as well as a distance between the mobile station and the base station. The propagation loss for low frequency band is smaller than that for high frequency band. Therefore, the faraway base or mobile station can receive larger reception power when a lower frequency band is utilized.

When radio waves penetrate buildings and so on, the penetration loss is smaller for low frequency bands. Therefore an indoor mobile station can receive larger reception power when using low frequency bands, compared with high frequency bands.

Under a multi-fading environment, variation (or fluctuation) cycles of a reception power variation and a reception phase variation due to mobile station's moving are longer or slower for low frequency bands, compared with high frequency bands. The variations for low frequency bands are slow with respect to the moving speed of the mobile station, and therefore can follow fading well.

In general, high frequency bands can bring broad frequency bandwidth per one system and allow large system capacity.

Figure 3B:
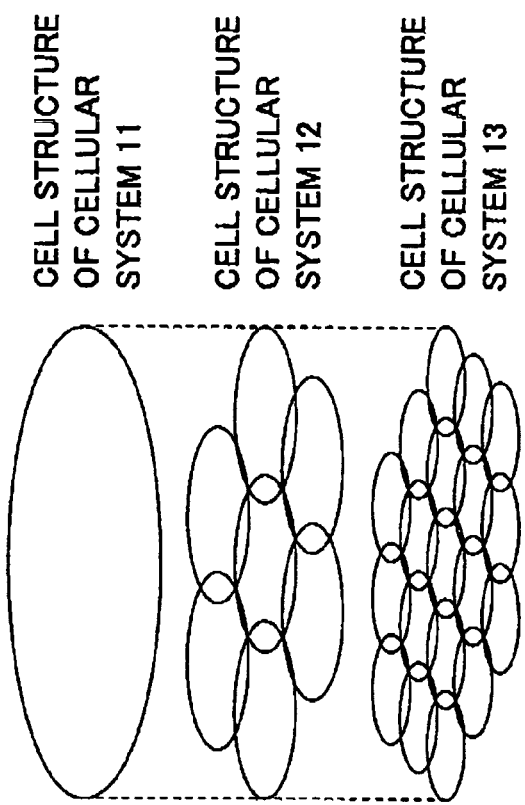
FIG. 3 is a schematic view illustrating geological service areas of plural cellular systems to which the present invention is applicable.
Figure 3A:
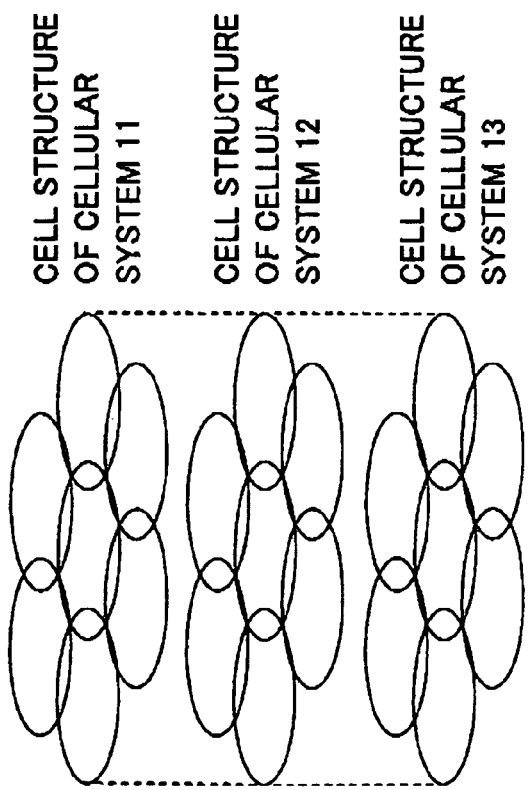

FIGS. 3A and 3B show cell establishing structures of each cellular system as shown in FIG. 1.

As shown in FIG. 3A, when these three cellular systems establish the same cell structure, each cellular system can share the same base stations. The propagation characteristics between base and mobile stations depend on frequency band only, so multi-band control can be realized by a simple construction.

On the other hand, in FIG. 3B, a higher frequency band system has smaller cells, and the three cellular systems establish different cell size structures. In this situation, cell structures can be established by considering the propagation characteristics of each frequency band. However, each base station must be provided for each cellular system, and complex multi-band control is needed while considering differences in the propagation characteristics between the base and mobile stations.

FIG. 4 schematically shows a concept of a multi-band mobile communication system according to this embodiment of the present invention.

When a call is generated, it is required to allocate a radio communication channel and a radio control channel to the call. The radio communication channel is a channel in which a mobile station and a base station exchanges user information. The radio control channel is a channel in which pieces of control information are transmitted for establishing, maintaining and managing call communication link and connection.

After calling, a frequency band used for the radio communication channel is determined, and a radio communication channel is allocated to transmit the user information. In addition, a frequency band used for the radio control channel is determined, and a radio control channel is allocated to transmit the control information.

When allocating the radio communication channel, propagation characteristics for each frequency band and conditions required for user information are considered. The propagation characteristics are determined based on information reported from base stations in each cellular system.

When establishing the radio control channel, its frequency band is considered. It is possible to determine the optimal frequency band used for transmitting the control information, considering at least a part of information about the control information (kinds of control information, amount of control information, desired quality of control information), control accuracy (transmission quality, transmission delay), frequency band used for radio communication channel for transmitting caller's user information, system information (radio resource and network structure of each cellular system), frequency availability, propagation characteristics (transmission loss, building penetration loss) for each frequency band, and so on.

More specifically, kinds of control information include control information for maintaining transmission quality of the radio communication channel in physical layer regarding control subjects, and include control information against control subjects, such as calling control in a higher layer.

The amount of control information is calculated based on kinds of control information and on how frequent the control information is transmitted. When high speed transmission is performed utilizing a high frequency band, amounts of information required for maintaining transmission quality and control information required for controlling callings are increased.

The desired qualities with respect to the control information may be bit error rates in accordance with the kinds of control information, or tolerable control delay time, and so on. These qualities should be considered since the control accuracy depends on the control information qualities.

Information with respect to the frequency band used for the radio communication channel for transmitting caller's user information may include, for example, received signal power or bit error rate in the radio communication channel.

The system information may include networking structure information such as existence of higher stations, and transmission delay between base stations in each system. The system information may further include radio resource information such as the number of radio control channels securable in each system, and availability of the radio control channels.

According to the embodiment in which user information and control information are transmitted via different cellular systems, it is possible to realize highly accurate resource control by considering information such as the existence of higher stations and transmission delay in each system, and radio control channel availability in each cellular system.

FIGS. 5A and 5B schematically show system structures of multi-band mobile communication systems according to this embodiment.

FIG. 5A shows an example that the three cellular systems establish the same cell structure. FIG. 5B shows an example that the three cellular systems establish hierarchical structure using different cell sizes.

Each cellular system is provided with plural base stations 31, 32 and 33 that transmit radio signals over frequency bands 21, 22 and 23, respectively.

In FIG. 5A, base stations $31_1$, $32_1$ and $33_1$ for corresponding cellular systems are located at the same relative position. Similarly, base stations $31_2$, $32_2$ and $33_2$ for corresponding cellular systems are located at the same relative position. In FIG. 5B, base stations $31_1$, $32_1$ and $33_1$ for corresponding cellular systems are located at different relative positions. Coverage is different from base station to base station.

On the other hand, mobile stations $4_1$, $4_2$, $4_3$ and $4_4$ can receive any radio signal over frequency bands 21, 22 and 23 (see FIG. 1) and can be connected to any base station. The mobile stations $4_1$, $4_2$, $4_3$ and $4_4$ can establish a radio communication channel for transmitting user information and a radio control channel for establishing, maintaining and managing communication link and connection, independently over the same frequency band or different frequency bands.

The mobile station $4_1$, for example, establishes a radio communication channel over the frequency band 23 for transmitting user information to the base station $33_1$, and establishes a radio control channel over the frequency band 22 lower than the frequency band 23 for transmitting control information to the base station $32_1$. In this manner, it is possible to determine the optimal frequency band for transmitting the control information, in accordance with kinds of control information, amount of control information, desired control quality (transmission quality and control delay), cellular system availability, frequency availability, propagation characteristics of each frequency band, and so on.

Figure 6:
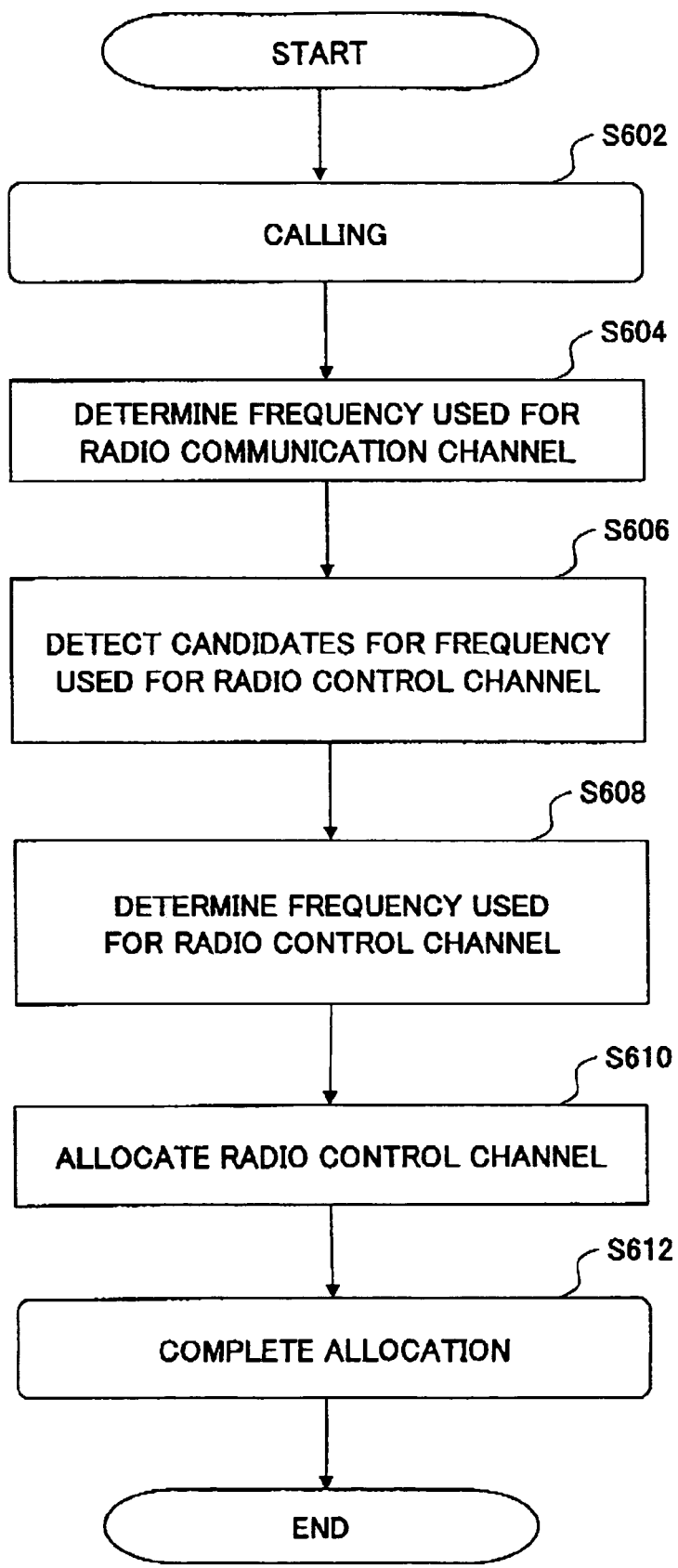
FIG. 6 is a flowchart showing procedures in the multi-band mobile communication system according to one embodiment of the present invention.

Next, multi-band control procedure in the multi-band mobile communication system according to the embodiment is explained with reference to FIG. 6.

A call is generated at step S602. After the call generation, radio communication channel frequency band is determined for transmitting user information between a base station and a mobile station, and a radio communication channel is allocated at step S604.

Next, candidates for radio control channel are detected based on the radio communication channel frequency band at step S606. The radio control channel is a channel for establishing, maintaining and managing this call's communication link and connection.

A frequency band for establishing radio control channel is determined in accordance with the conditions required for the control information to be transmitted and the propagation characteristics of each frequency band at step 608. A radio control channel is established among the determined frequency band at steps S610, S612.

The frequency band candidates detected at step S606 is explained with reference to FIG. 7.

With respect to radio communication channel frequency bands $f_1$; $f_2$; and $f_3$, radio control channel frequency band candidates $f_1$; $f_1$ and $f_2$; and $f_1$, $f_2$ and $f_3$ are selected, respectively. Herein $f_1$ is the system frequency band 21, $f_2$ is the system frequency band 22 and $f_3$ is the system frequency band 23, and $f_1 < f_2 < f_3$.

In this manner, the radio control channel is established based on a common control channel containing common control information such as system information and cell information transmitted from each radio base station. The radio control channel is selected from among the frequency bands that are the same as or lower than the radio communication channel frequency band used for transmitting user information of the call, and therefore the control information can be transmitted with transmission quality that is the same as or better than that of the radio communication channel.

As shown in FIG. 8, with respect to radio communication channel frequency bands $f_1$; $f_2$; and $f_3$, radio control channel frequency band candidates $f_1$; $f_1$; and $f_2$ may be selected. Herein $f_1$ is the system frequency band 21, $f_2$ is the system frequency band 22 and $f_3$ is the system frequency band 23, and $f_1 < f_2 < f_3$.

In this manner, by arranging radio communication channel frequency bands of each cellular system in order and simply selecting a radio control channel frequency band that is the same as or lower by one level than the radio communication frequency band for each cellular system, it is possible to easily determine the radio control channel frequency bands by simple procedure. The radio control channel is selected among the frequency bands that are the same as or lower than the radio communication channel frequency band used for transmitting user information of the call, and therefore the control information can be transmitted with transmission quality that is the same as or better than that of the radio communication channel. It is possible to establish the radio control channel, considering a ratio of control information amount to user information transmitted over the radio communication channel and the quality required for control information. For example, if the radio communication frequency bands 21, 22, 23 are arranged in upward order, and a radio communication channel is established at the frequency band 22, then its corresponding radio control channel is established at the frequency band 21.

Figure 9:
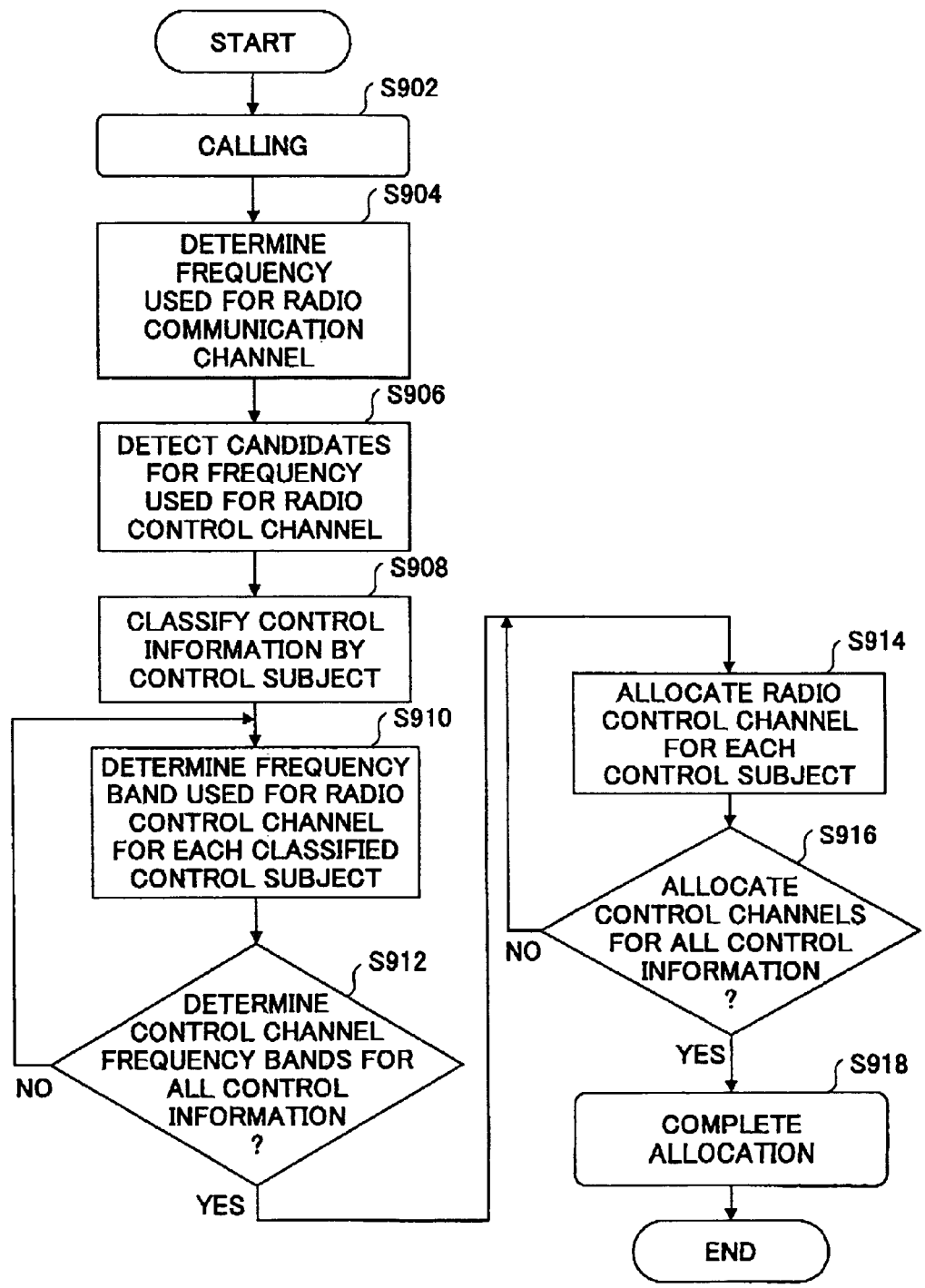
FIG. 9 is a flowchart showing procedures in the multi-band mobile communication system according to one embodiment of the present invention.

A control channel determining procedure in the multi-band control procedure is explained with reference to FIG. 9.

A call is generated at step S902. After the call generation, a radio communication channel frequency band is determined for transmitting user information between a base station and a mobile station, and a radio communication channel is allocated at step S904.

Next, candidates for a radio control channel are detected based on the radio communication channel frequency band at step S906. The radio control channel is a channel for establishing, maintaining and managing this call's communication link and connection.

Next, control information is classified by control subjects at step S908. With respect to each of the classified control information items, a radio control channel frequency band is determined in accordance with its required condition and propagation characteristics at step S910.

If radio control channel frequency bands have not been determined for all control information (NO at step S912), the procedure goes back to step S910. On the other hand, if radio control channel frequency bands have been determined for all control information (YES at step S912), the procedure goes to step S914, where a radio control channel among the determined frequency bands is allocated to each control information items.

If radio control channels have not been allocated for all the control information (NO at step S916), the procedure goes back to step S914. On the other hand, If radio control channels have been allocated for all the control information (YES at step S916), the allocation is completed at step S918.

The frequency band candidates at step S906 are detected based on the rules explained with reference to FIG. 7 and FIG. 8.

An example method of classifying control information at step S908 is explained with reference to FIG. 10. The control information to be transmitted for establishing, maintaining and managing the call communication link and connection is classified by control subjects and purposes.

When the control subject is communication quality control such as communication channel transmission power control in a physical layer, low control-delay is required to realize high speed control capable of following instantaneous receiving power variation. For example, when it is necessary to control high speed transmission power following fading effects for communication channels, control delay should be small.

When the control subject is communication control such as hand over control of communication channels in a physical layer, it is required to reduce control delay and transmission quality degradation for realizing high accuracy control capable of following slow reception power variation. For example, in a case where hand over control capable of following shadowing variation is performed to improve communication channel transmission quality, it is necessary to alleviate communication quality degradation to avoid errors in designating a base station to be connected.

When the control subject is call control in a physical layer, it is required to reduce transmission quality degradation for improving user information quality. For example, in a layer near to the core network, when high accuracy call control is performed, high quality transmission is expected. In this case, since the control is upper to the base stations, signal transmission between base stations has less effect.

After classifying the control information, radio control channels in different frequency bands are established for classified control information, in accordance with their information amount desired, control accuracy, and tolerable control delay. Control factors and rules for determining radio control channel frequencies in this embodiment are explained with reference to FIG. 11.

When the amount of control information to be transmitted is large, it is desired to select a high frequency band to be used for the radio control channel, and it is preferred to select as high a frequency as possible among frequency bands lower than the radio communication channel. In this manner, it is possible to establish the optimal radio control channel that can transmit all the control information required for establishing, maintaining and managing the call communication link and connection while maintaining transmission quality higher than or the same as that of the radio communication channel. It is also possible to establish the optimal radio control channel for a variety of purposes.

When the required quality of control information transmission is high, it is desired to select a low frequency band to be used for the radio control channel, and it is preferred to select a frequency as much lower as possible than the radio communication channel frequency band. In this manner, it is possible to establish a radio control channel that can highly accurately transmit all the control information necessary for establishing, maintaining and managing the call communication link and connection.

When the tolerable control-delay is small, it is desired to select a radio control channel frequency band that is the same as that of the radio communication channel. In this manner, it is possible to establish a radio control channel capable of minimizing the control delay that occurs due to time required for processing radio signals such as processing in the radio signal processor or signal transmission between the systems.

When the required condition for coverage is narrow, it is desired to select a high frequency band to be used for the radio control channel, and it is preferred to select as high a frequency as possible, among the frequency bands lower than that of the radio communication channel. In this manner, it is possible to transmit the control signals to a wide area wider than the base station coverage because of the propagation characteristics (propagation loss, building penetration loss) and improve the control signal transmission quality.

An example method of determining radio control channels is explained with reference to FIG. 12.

When the automatic repeat request (ARQ) control is performed to improve the transmission quality of downlink radio communication channels, it is necessary to transmit feedback information to perform the ARQ control in the upward link. In a case where the upward link and downward link use the same frequency band, if the upward link is allocated a higher frequency than the downlink, then the upward link transmission quality is degraded due to the high frequency and limitation on mobile station transmission power.

If the feedback information is transmitted under this environment, errors occur in the feedback information transmission to degrade user information transmission quality in the downlink as a result. Therefore, only the radio control channel frequency band in the upward link is set lower than the communication channel frequency band, and high accuracy feedback control can be realized. In this case, the downward link radio control channel can use a frequency band that is the same as or different from the upward link.

As shown in FIG. 12, with respect to the downlink radio communication channel frequency bands $f_1$; $f_2$; and $f_3$, the uplink radio control channel frequency band candidates $f_1$; $f_1$ and $f_2$; and $f_1$, $f_2$ and $f_3$ are selected, respectively. Herein $f_1$ is the system frequency band 21, $f_2$ is the system frequency band 22 and $f_3$ is the system frequency band 23, and $f_1<f_2<f_3$.

Although the relationships between the downward link communication channels and the upward control channels are shown here, the downward link control channels and upward link communication channels may use any frequency bands.

In this manner, it is possible to reduce transmission errors in the upward link control information and improve the feedback control accuracy and the downlink transmission quality.

Figure 13:
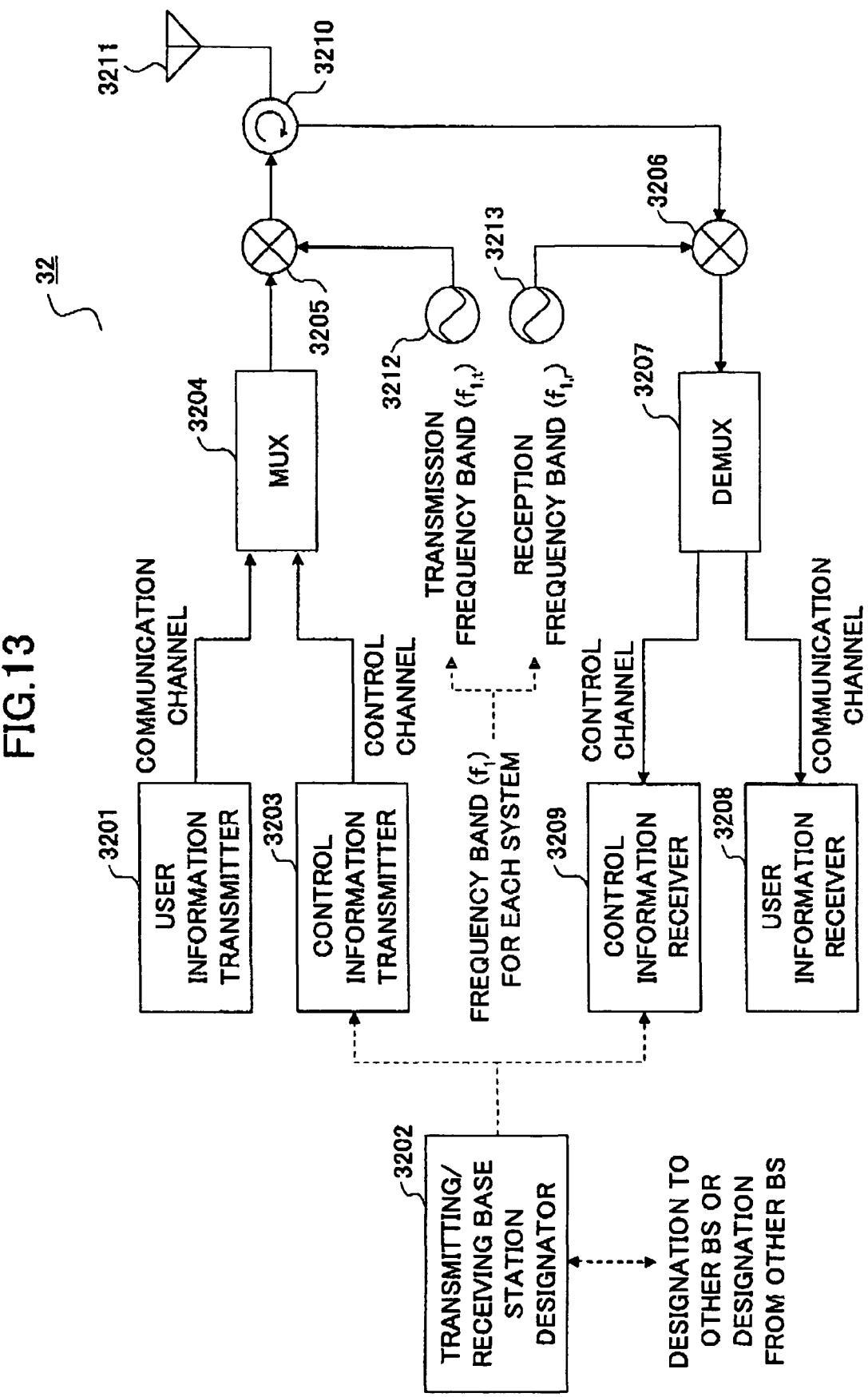
FIG. 13 is a block diagram showing a base station structure example in the multi-band mobile communication system according to one embodiment of the present invention.

An example of base station structure realizing multi-band mobile communication systems according to this embodiment is explained with reference to FIG. 13. It is assumed that the mobile station $4_1$ explained above with reference to FIGS. 5A, 5B connects its radio control channel to the bases station $32_1$, and its communication channel to the base station $32_1$. It is also assumed that the mobile station $4_2$ connects its radio control channel to the bases station $32_1$, and its communication channel to the base station $33_1$. Under this assumption, the base station $32_1$ is explained below.

The base station 32 according to this embodiment comprises a user information transmitter 3201, a control information transmitter 3203, a transmission signal multiplexer (MUX) 3204 connected to the user information transmitter 3201 and the control information transmitter 3203, and up converter 3205 connected to the MUX 3204, a frequency synthesizer 3212 and a circulator 3210 connected to the up converter 3205, an antenna 3211 and a down converter 3206 connected to the circulator 3210, a received signal demultiplexer (DEMUX) 3207 and a frequency synthesizer 3213 connected to the down converter 3206, a control information receiver 3209 and a user information receiver 3208 connected to the DEMUX 3207, and a transmitting/receiving base station designator 3202 connected to the control information transmitter 3203 and the control information receiver 3209. The transmitting/receiving base station designator 3209, the control information transmitter 3203, the control information receiver 3209, the frequency synthesizer 3212 and 3213 constitute a radio frequency selection device.

Since that the base station 32, belongs to the cellular system 12, it transmits radio signals using the system frequency band 22. The user information transmitter 3201 of the base station $32_1$ generates and modulates user information to be transmitted to the mobile station $4_1$ and allocates a communication channel and inputs it to the MUX 3204.

On the other hand, the transmitting/receiving base station designator 3202 designates a base station for transmitting/receiving control information to establish, maintain and manage communication link and connection for the calling mobile station.

In a case where the base station $33_1$ and the mobile station $4_2$ transmit the user information, the transmitting/receiving base station designator of the base station $33_1$ designates a base station to transmit control information of the mobile station $4_2$ in consideration of the propagation characteristics of each frequency band and conditions required for establishing, maintaining and managing the call's communication link and connection. For example, if the base station $32_1$ is designated as the best station, the transmitting/receiving base station designator of the base station $33_1$ designates that the transmitting/receiving base station designator 3202 of the base station $32_1$ should transmit the control information of the mobile station $4_2$. Based on this designation, the transmitting/receiving base station designator 3202 of the base station $32_1$ instructs the control information transmitter 3203 and the control signal receiver 3209 to establish a radio control channel with the mobile station $4_2$.

Based on the base station designation by the transmitting/receiving base station designator 3202, the control information transmitter 3203 generates and modulates control information for the mobile station $4_2$ that has called to the base station $33_1$, for example. Then the control information transmitter 3203 allocates a radio control channel and inputs the control information to the MUX 3204. The MUX 3204 multiplexes the input communication channel and control channel. The multiplexed transmission signals are up converted to the system frequency band 22 of the base station $32_1$ by the up converter 3205. In this case, the frequency synthesizer 3212 designates a transmission frequency. The up converted signals are transmitted to the mobile stations $4_1$ and $4_2$ via the antenna 3211, as the radio communication channel and the radio control channel.

On the other hand, a radio communication channel transmitted from the mobile station $4_1$ and a radio control channel transmitted from the mobile station $4_2$ are received via the antenna 3211 as multiplexed radio signals. The received multiplexed signals are down converted to the system frequency band 22 of the base station $32_1$ by the down converter 3206. In this case, the frequency synthesizer 3213 designates a receiving frequency. The down converted signals are input to the DEMUX 3207, where they are separated into radio communication channel signals transmitting user information from the mobile station $4_1$ and radio control channel signals transmitting the control signals from the mobile station $4_2$ and input to the user information receiver 3208 and the control information receiver 3209.

The user information receiver 3208 receives and demodulates the communication channel separated by the DEMUX 3207, and reproduces the user information transmitted by the mobile station $4_1$. Based on the base station designation by the transmitting/receiving base station designator 3202, the control information receiver 3209 receives and demodulates the radio control channel separated by the DEMUX 3207, and reproduces the control information transmitted by the mobile station $4_2$.

In this base station structure, when one mobile station transmits its user information to one base station, the mobile station can transmit its control information via a different base station using a different frequency. By determining a frequency band to be used for the radio control channel in consideration of the propagation characteristics of each frequency and the conditions required for the control information, it is possible to realize highly accurate control and effective use of frequency resource.

Figure 14:
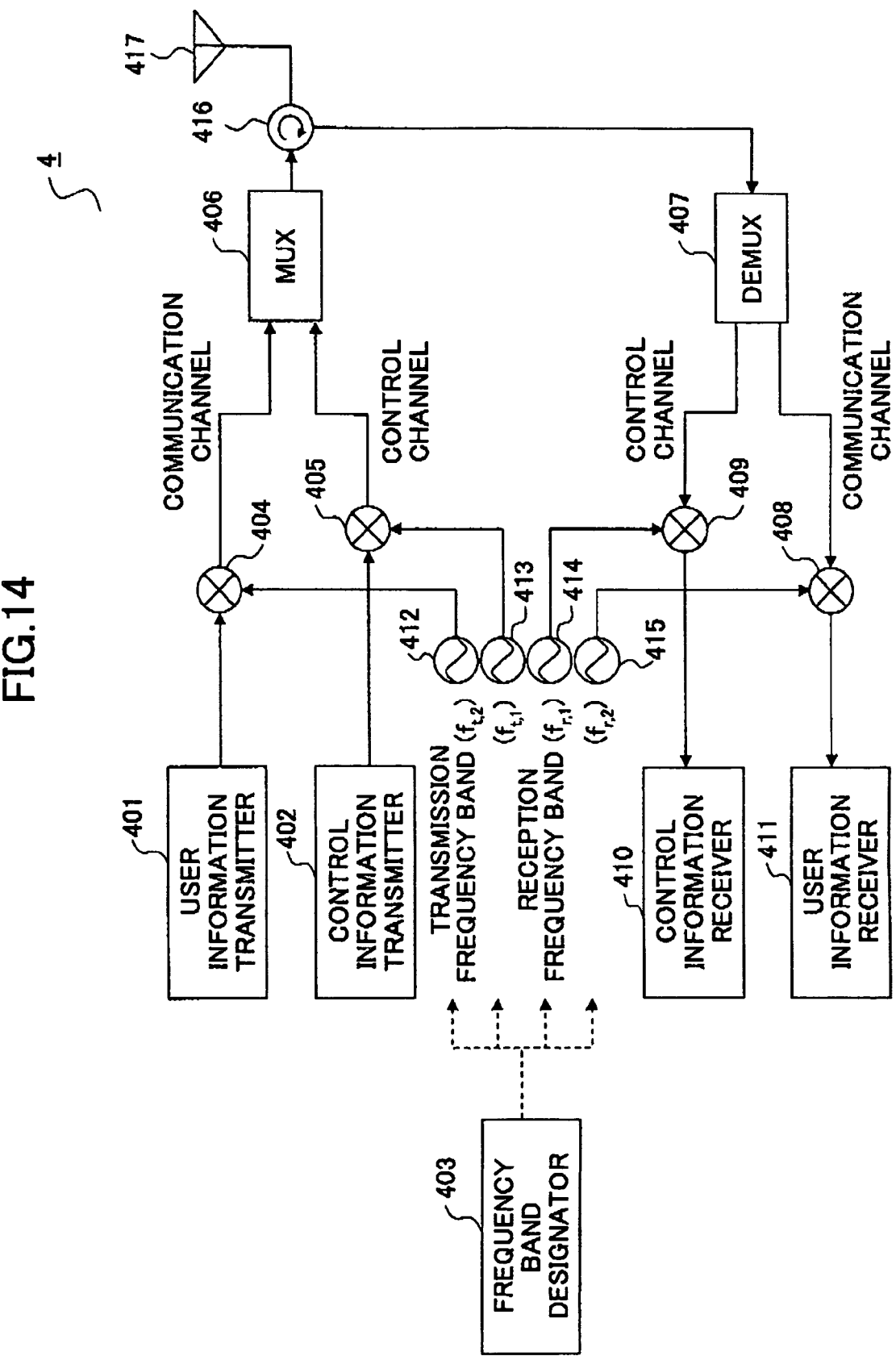
FIG. 14 is a block diagram showing a mobile station structure example in the multi-band mobile communication system according to one embodiment of the present invention.

Next, an example of mobile station structure realizing multi-band mobile communication systems according to this embodiment is explained with reference to FIG. 14. It is assumed that the mobile station $4_1$ explained above with reference to FIGS. 5A, 5B connects its radio control channel to the base station $31_1$, and its communication channel to the base station $32_1$.

The mobile station 4 according to this embodiment comprises a user information transmitter 401, a frequency synthesizer 412, a communication channel up converter 404 connected to the user information transmitter 401 and the frequency synthesizer 412, a control information transmitter 402, a frequency synthesizer 413, a control channel up converter 405 connected to the control information transmitter 402 and the frequency synthesizer 413, a transmission signal multiplexer (MUX) 406 connected to the communication channel up converter 404 and the control channel up converter 405, a circulator 416 connected to the MUX 406, an antenna 417 and a received signal demultiplexer (DEMUX) 407 connected to the circulator 416, a control channel down converter 409 and a communication channel down converter 408 connected to the DEMUX 407, a control information receiver 410 and a frequency synthesizer 414 connected to the control channel down converter 409, a user information receiver 411 and a frequency synthesizer 415 connected to the communication channel down converter 408, and a frequency band designator 403 connected to the frequency synthesizers 412, 413, 414 and 415. The frequency designator 403, the control information transmitter 402, the control information receiver 410, and the frequency synthesizers 412, 413, 414 and 415 constitute a radio frequency selection device.

The mobile station 4 ($4_1$) can connect to any of the cellular systems 11, 12 and 13, and can transmit radio signals using any of the system frequency bands 21, 22 and 23. The user information transmitter 401 of the mobile station $4_1$ generates and modulates user information to be transmitted to the base station $32_1$ and allocates a communication channel and inputs it to the communication channel up converter 404.

The control information transmitter 402 generates and modulates control information to be transmitted to the base station $31_1$ and allocates a radio control channel and inputs it to the control channel up converter 405.

The frequency designator 403 designates a system frequency band (that is a transmission channel) to be utilized in the radio communication channel and the radio control channel, and notifies the communication channel up converter 404 and the control channel up converter 405 via the frequency synthesizers 412, 413.

In this embodiment, the radio communication channel uses the frequency band 22, and the radio control channel uses the frequency band 21. Based on the designation by the frequency designator 403, the communication channel up converter 404 up converts the communication channel to the frequency band 22 and inputs it to the MUX 406. Similarly, the control channel up converter 405 up converts the control channel to the frequency band 21 and inputs to the MUX 406. The MUX 406 multiplexes the radio communication channel and the radio control channel and transmits the multiplexed signals as radio signals via the antenna 417.

On the other hand, the multiplexed radio signals of the radio communication channel transmitted from the base station $32_1$ and the radio control channel transmitted from the base station $31_1$ are received via the antenna 417. The received multiplexed signals are input to the DEMUX 407. The DEMUX 407 separates the received multiplexed signals into a radio communication channel and radio control channel and inputs them to the communication channel down converter 408 and the control channel down converter 409, respectively.

The frequency designator 403 designates a frequency band (that is receiving frequency) to be used in the radio communication channel and the radio control channel, and notifies the communication channel down converter 408 and the control channel down converter 409 via frequency synthesizers 415 and 414, respectively.

Based on the designation by the frequency band designator 403, the communication down converter 408 down converts the radio communication channel separated by the DEMUX 407 from the frequency band 22, and inputs the down converted signals to the user information receiver 411. Similarly, based on the designation by the frequency designator 403, the control channel down converter 409 down converts the radio control channel separated by the DEMUX 407 from the frequency band 21, and inputs the down converted signals to the control information receiver 410.

The user information receiver 411 receives and demodulates the communication channel output from the communication channel down converter 408, and reproduces user information transmitted from a user information transmitting base station such as the base station $32_1$. The control information receiver 410 receives and demodulates the control channel output from the control channel down converter 409 and reproduces control information transmitted from the control information transmitting base station such as the base station 311.

In this mobile station structure, when one mobile station transmits user information to one base station, the mobile station can transmit it via a different base station using a different frequency band. By determining a frequency band to be used for the radio control channel in consideration of the propagation characteristics of each frequency and the conditions required for the control information, it is possible to realize highly accurate control and effective use of frequency resource.

Next, an example of a multi-band mobile communication system according to the first embodiment of the present invention is explained with reference to FIG. 15.

In the system according to this embodiment, the mobile station $4_1$ explained above with reference to FIGS. 5A, 5B connects its control channel to the base station $31_1$, and connects its communication channel to the base station $32_1$. In this case, the base station $32_1$ connecting the communication channel determines a frequency band to be used in the control channel, and the mobile station $4_1$ determines a base station to which the control channel is connected.

The base station $31_1$ comprises a radio frequency selection device. The radio frequency selection device comprises a user information transceiver 3112, a control information transceiver 3113, a frequency band designator 3114, a transmitting/receiving base station designator 3102 connected to the control information transceiver 3113. Similarly, the base station $32_1$ comprises a radio frequency selection device, which comprises a user information transceiver 3212, a control information transceiver 3213, a frequency band designator 3214, a transmitting/receiving base station designator 3202 connected to the control information transceiver 3213.

The mobile station $4_1$ comprises a radio frequency selection device, which comprises a user information transceiver 418, a control information transceiver 419, a frequency band designator 420, a transmitting/receiving base station designator 421 connected to the control information transceiver 419.

The user information transceiver 3212 of the base station $32_1$ is connected to the user information 418 of the mobile station $4_1$, the frequency band designator 3214 of the base station $32_1$ is connected to the frequency band designator 420 of the mobile station $4_1$, and the transmitting/receiving base station designator 3202 of the base station $32_1$ is connected to the transmitting/receiving base station designator 421 of the mobile station $4_1$ and the transmitting/receiving base station designator 3102 of the base station $31_1$. The control information transceiver 3113 of the base station $31_1$ is connected to the control information transceiver 419 of the mobile station $4_1$.

The frequency band designator 3214 of the base station $32_1$ providing the communication channel determines a frequency band to be used in the control channel, and notifies the mobile station $4_1$ and the transmitting/receiving base station designator 3202 of the base station $32_1$. The transmitting/receiving base station designator 3202 determines a base station (for example, the base station $31_1$) to which the mobile station $4_1$ connects its control channel, and notifies the mobile station $4_1$ and the base station $31_1$. Based on the designation by the base station $32_1$, the frequency band designator 420 of the mobile station $4_1$ and the frequency band designator 3114 of the base station $31_1$ establish a frequency band and a control channel to be used.

Figure 16:
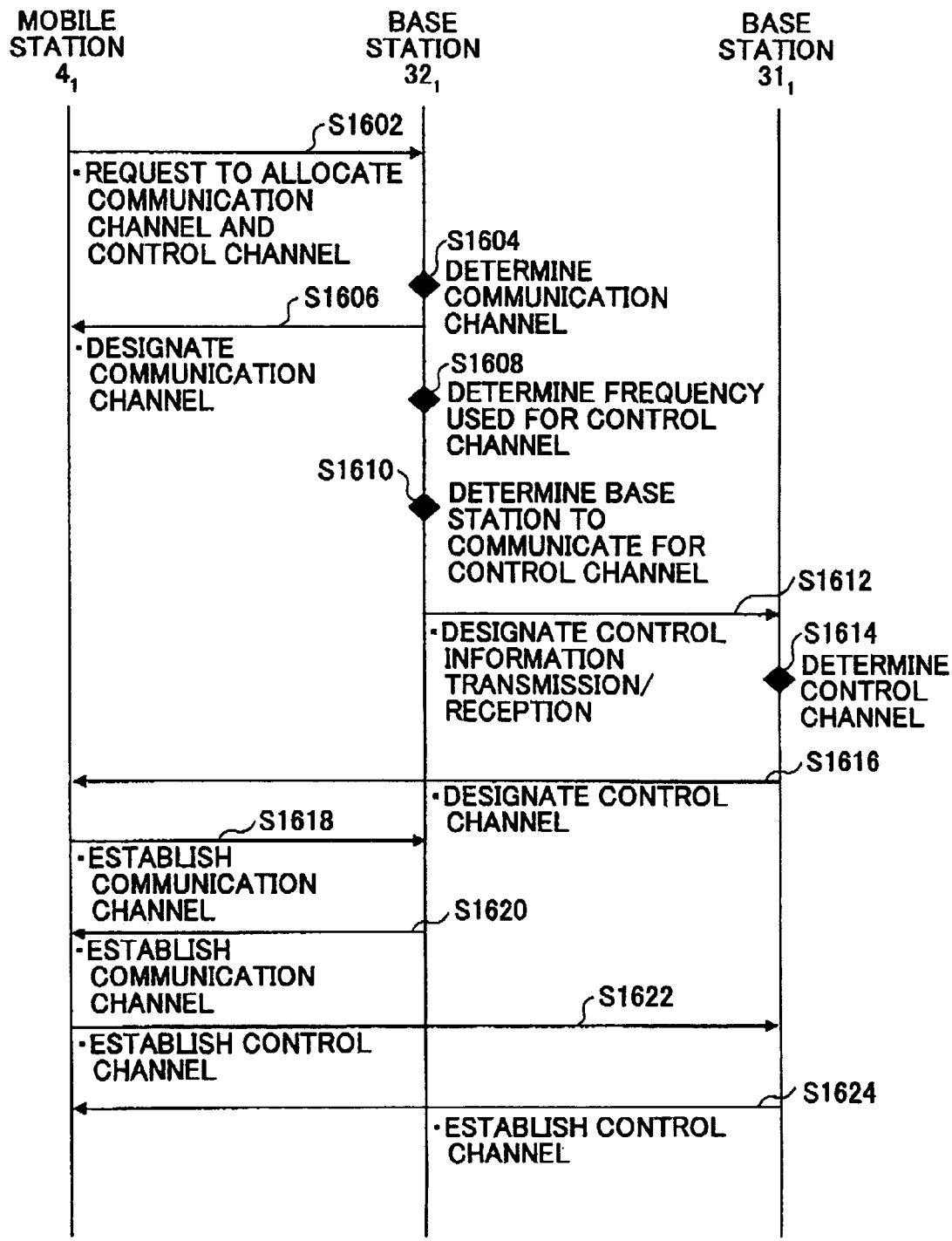
FIG. 16 is a sequence chart illustrating a control sequence in a multi-band mobile communication system according to one embodiment of the present invention.

A control sequence is explained with reference to FIG. 16.

After a call is generated, the system must determine a radio communication channel that transmits user information and a radio control channel that transmits control information for establishing, maintaining and managing communication for the call. The mobile station $4_1$ that has generated the call makes a request to allocate a radio communication channel and a radio control channel to base station $32_1$ at step S1602.

In response to this request, a user information transmitting base station such as the base station $32_1$ determines a radio communication channel using its own system frequency band 22 at step S1604. The base station $32_1$ notifies (at step S1606) the mobile station $4_1$ of the communication channel determined at step S1604.

The base station $32_1$ determines (step S1608) a frequency band (for example the frequency band 21) to be used in the radio control channel in consideration of conditions required for the control information in the communication and the propagation characteristics of each frequency, and determines a control information transmitting/receiving base station (for example, the base station $31_1$) for transmitting control information to the mobile station $4_1$ using the determined frequency band, at step S1610. The base station $32_1$ instructs the base station $32_1$ determined at step S1610 to transmit/receive the control information to/from the mobile station $4_1$, at step S1612.

The base station $31_1$ determines a radio control channel using its own system frequency band 21, at step S1614. Based on the radio control channel determined at step S1614, the base station $31_1$ designates the control channel to the mobile station $4_1$, at step S1616.

The determined communication channel is established between the mobile station $4_1$ and the base station $32_1$ at steps S1618, S1620. The determined control channel is established between the mobile station $4_1$ and the base station 311 at steps S1622, S1624. In this manner, the transmission of the user information and the control information starts.

In this embodiment, the base station providing the communication channel can designate a frequency band to be used for the control channel.

Figure 17:
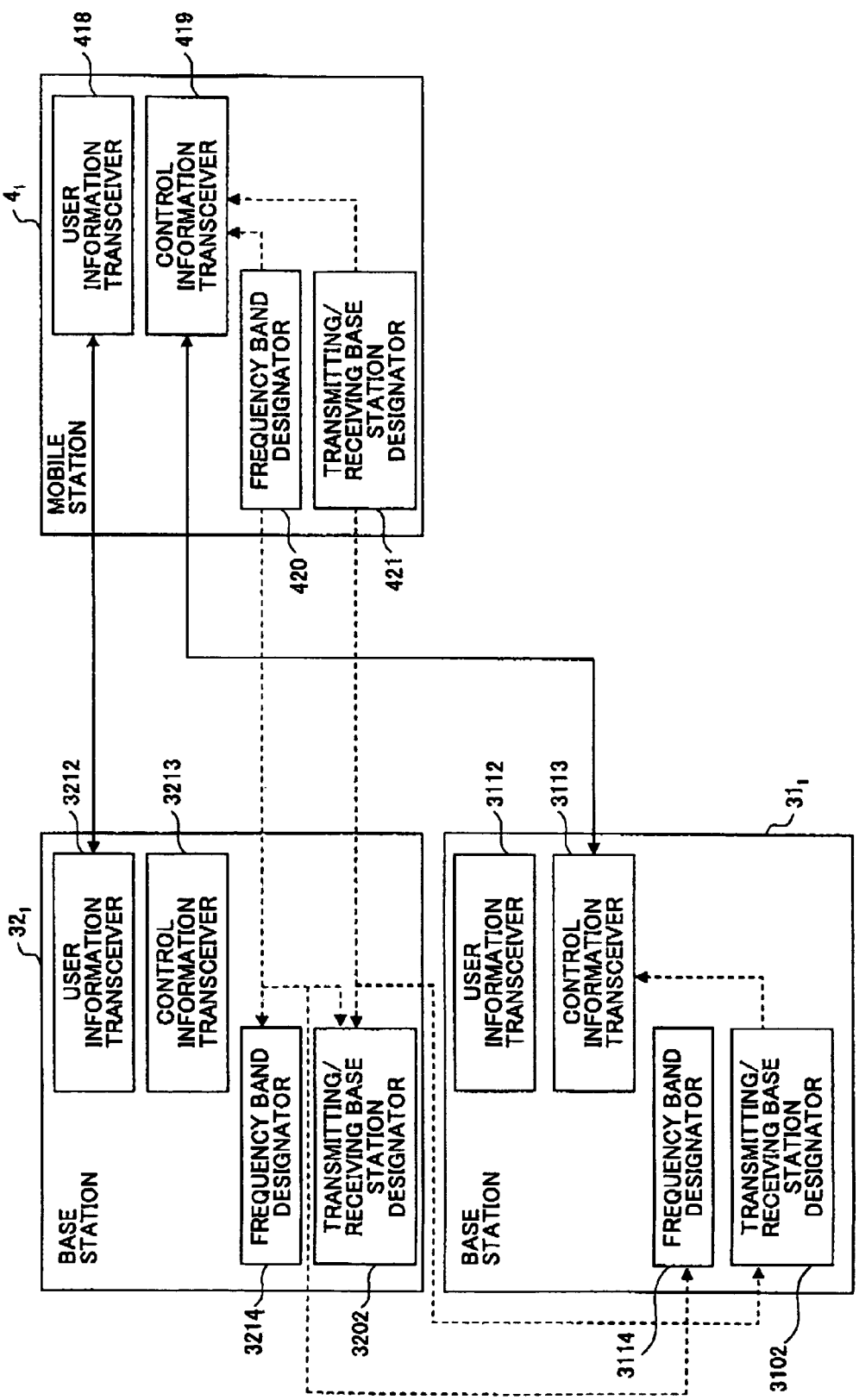
FIG. 17 is a block diagram showing a multi-band mobile communication system structure according to one embodiment of the present invention.

Next, an example of a multi-band mobile communication system according to a second embodiment of the present invention is explained with reference to FIG. 17.

In the system according to this embodiment, a mobile station determines a frequency band to be used in a control channel and a base station to which the mobile station connects the control channel.

Figure 15:
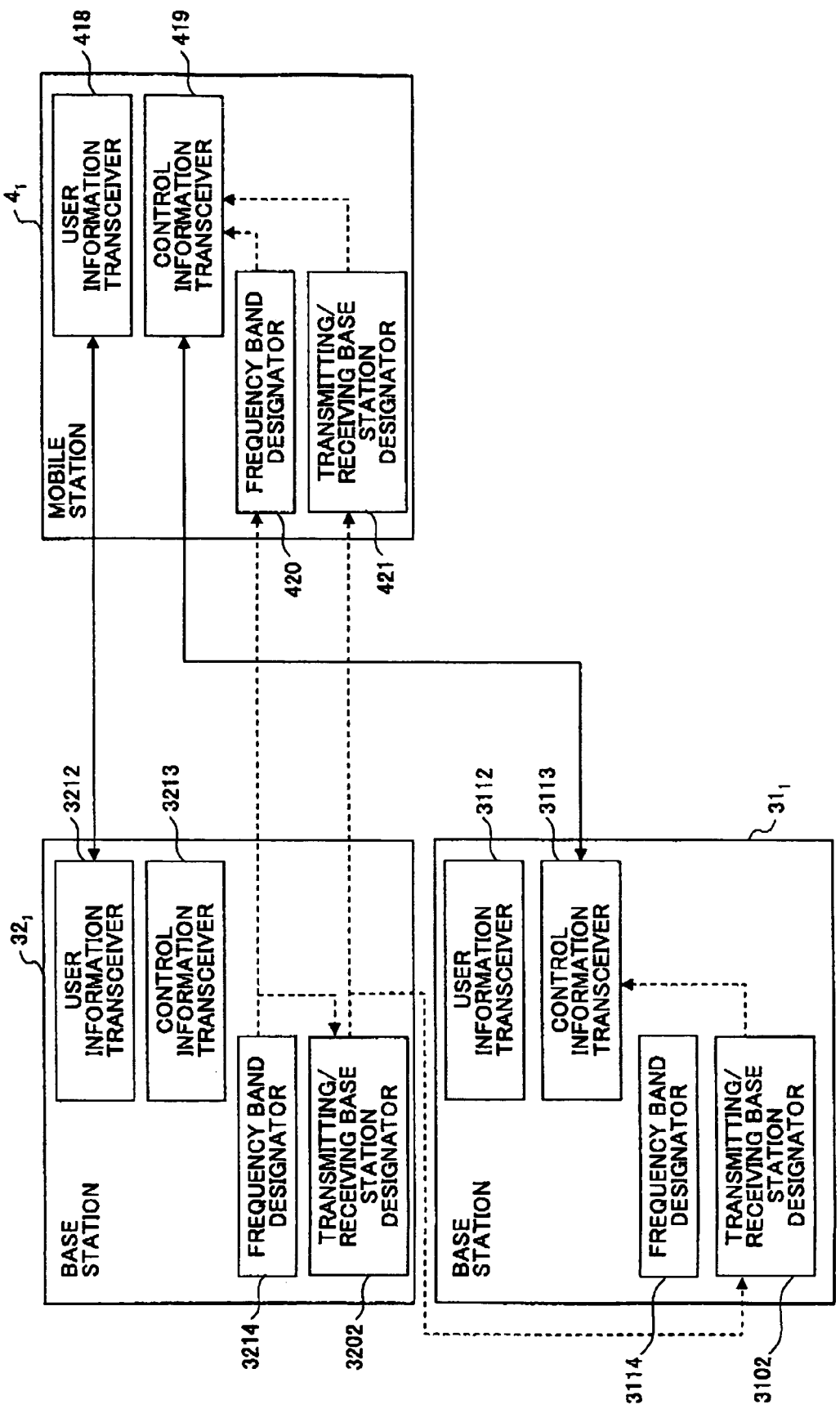
FIG. 15 is a block diagram showing a multi-band mobile communication system structure according to one embodiment of the present invention.

The system according to this embodiment is the same as the system shown in FIG. 15 except that the frequency designator 3214 of the base station $32_1$ is connected to the frequency designator 3114 of the base station $31_1$.

The frequency band designator 420 of the mobile station $4_1$ determines a frequency band to be used in the control channel, and notifies the frequency band designator 3214 of the base station $32_1$. The transmitting/receiving base station designator 421 of the mobile station $4_1$ determines a base station to which the control channel is connected, and notifies the base station $32_1$. Based on the designation by the mobile station $4_1$, the frequency band designator 420 of the mobile station $4_1$ and the frequency band designator 3114 of the base station $31_1$ establish a frequency band and a control channel to be used.

Figure 18:
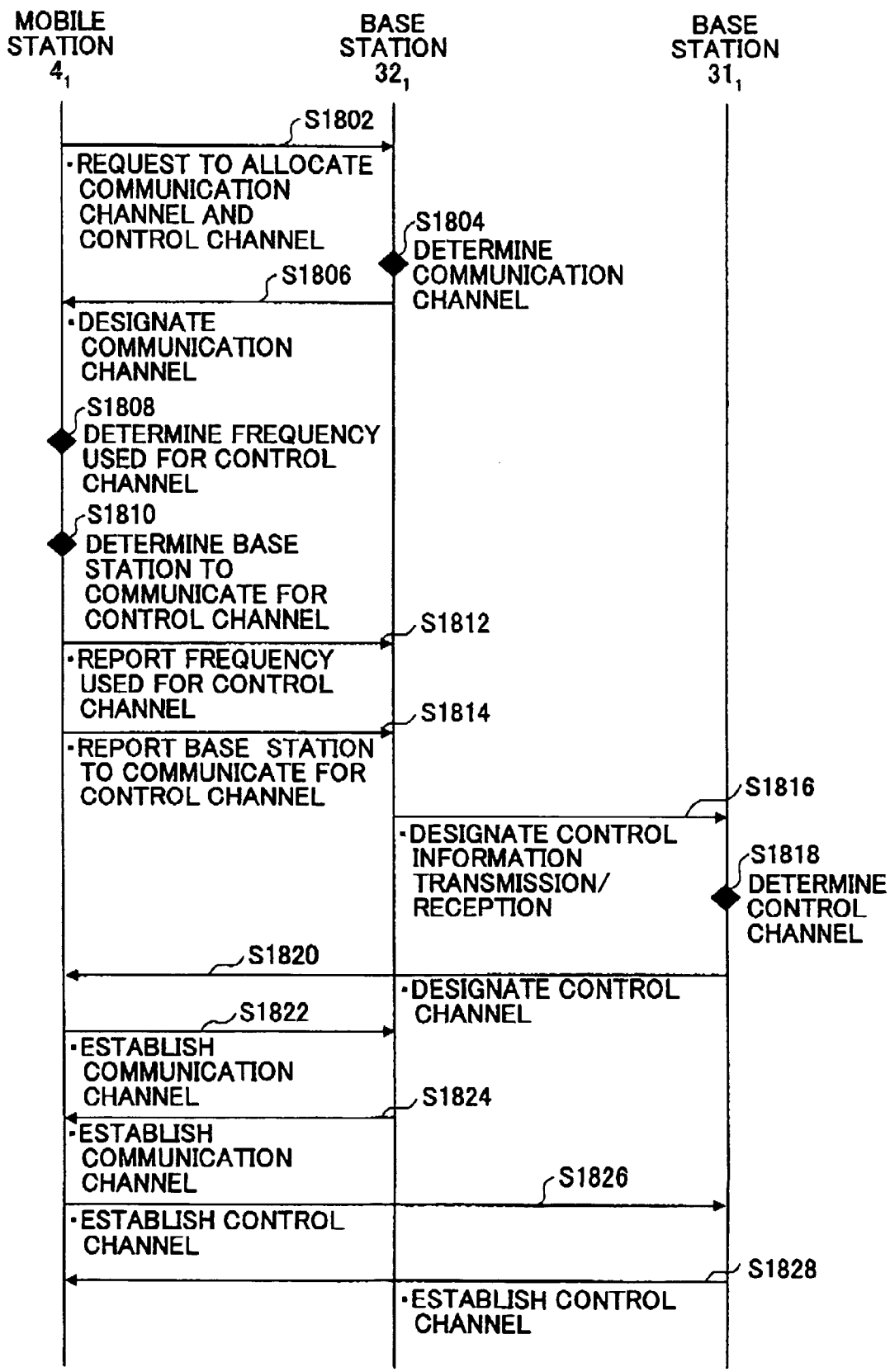
FIG. 18 is a sequence chart illustrating a control sequence in a multi-band mobile communication system according to one embodiment of the present invention.

A control sequence is explained with reference to FIG. 18.

After a call is generated, the system must determine a radio communication channel that transmits user information and a radio control channel that transmits control information for establishing, maintaining and managing communication for the call. The mobile station $4_1$ that has generated the call makes a request to allocate a radio communication channel and a radio control channel to base station $32_1$ at step S1802.

In response to this request, a user information transmitting base station such as the base station $32_1$ determines a radio communication channel using its own system frequency band 22 at step S1804. The base station $32_1$ notifies (at step S1806) the mobile station $4_1$ of the communication channel determined at step S1804.

The mobile station $4_1$ determines (step 1808) a frequency band (for example the frequency band 21) to be used in the radio control channel in consideration of conditions required for the control information in the communication and the propagation characteristics of each frequency, and determines a control information transmitting/receiving base station (for example, the base station $31_1$) for transmitting control information to the mobile station $4_1$ using the determined frequency band, at step S1810. The mobile station $4_1$ notifies the base station $32_1$ of the frequency band used for the control channel and the control information transmitting/receiving base station at steps S1812, S1814.

Based on the notice at step S1814, the base station $32_1$ instructs the base station $31_1$ to transmit/receive the control information to/from the mobile station $4_1$, at step S1816.

The base station $31_1$ determines a radio control channel using its own system frequency band 21 at step S1818, and designates the control channel to the mobile station $4_1$.

Next, the determined communication channel is established between the mobile station $4_1$ and the base station $32_1$ at steps S1822, S1824. The determined control channel is established between the mobile station $4_1$ and the base station $31_1$ at steps S1826, S1828. In this manner, the transmission of the user information and the control information starts.

In this embodiment, the mobile station can designate a frequency band to be used for the control channel.

Figure 19:
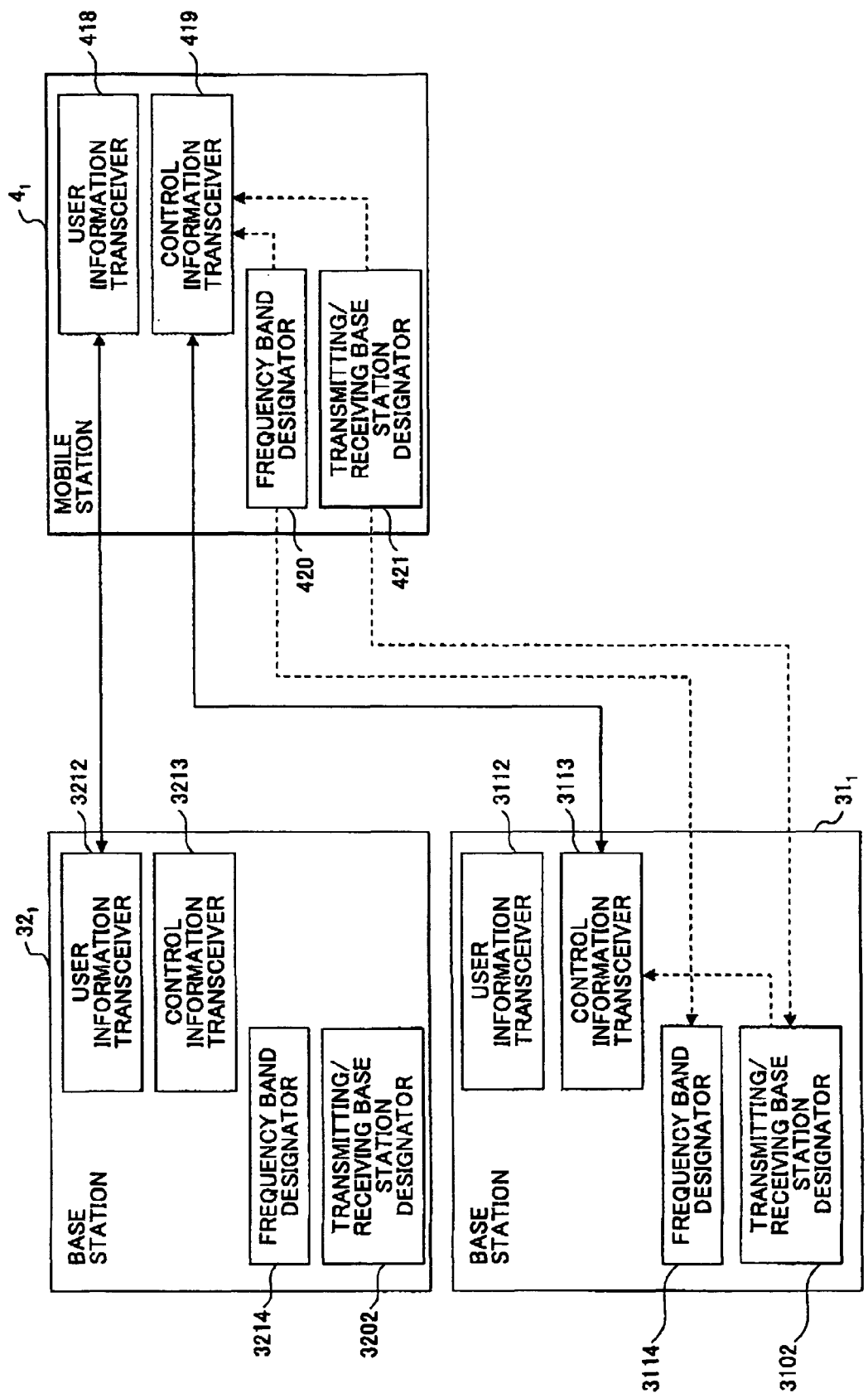
FIG. 19 is a block diagram showing a multi-band mobile communication system structure according to one embodiment of the present invention.

Next, an example of a multi-band mobile communication system according to a third embodiment of the present invention is explained with reference to FIG. 19.

In the system according to this embodiment also, a mobile station determines a frequency band to be used in a control channel and a base station to which the mobile station connects the control channel.

The base station $31_1$ comprises a radio frequency selection device. The radio frequency selection device comprises a user information transceiver 3112, a control information transceiver 3113, a frequency band designator 3114, a transmitting/receiving base station designator 3102 connected to the control information transceiver 3113. Similarly, the base station $32_1$ comprises a radio frequency selection device, which comprises a user information transceiver 3212, a control information transceiver 3213, a frequency band designator 3214, a transmitting/receiving base station designator 3202 connected to the control information transceiver 3213.

The mobile station $4_1$ comprises a radio frequency selection device, which comprises a user information transceiver 418, a control information transceiver 419, a frequency band designator 420 and a transmitting/receiving base station designator 421 connected to the control information transceiver 419. The user information transceiver 3212 of the base station $32_1$ is connected to the user information transceiver 418 of the mobile station $4_1$. The control information transceiver 3113, the frequency band designator 3114 and the transmitting/receiving base station designator 3102 of the base station $31_1$ are connected to the control information transceiver 419, the frequency band designator 420 and the transmitting/receiving base station designator 421 of the mobile station $4_1$.

The frequency band designator 420 of the mobile station $4_1$ determines a frequency band to be used in the control channel. The transmitting/receiving base station designator 421 of the mobile station $4_1$ determines a base station (for example, the base station $31_1$) to which the control channel is connected. The determined frequency band and the control information transmitting/receiving base station are reported to the frequency band designator 3114 and the transmitting/receiving base station designator 3102 of the base station $31_1$.

Figure 20:
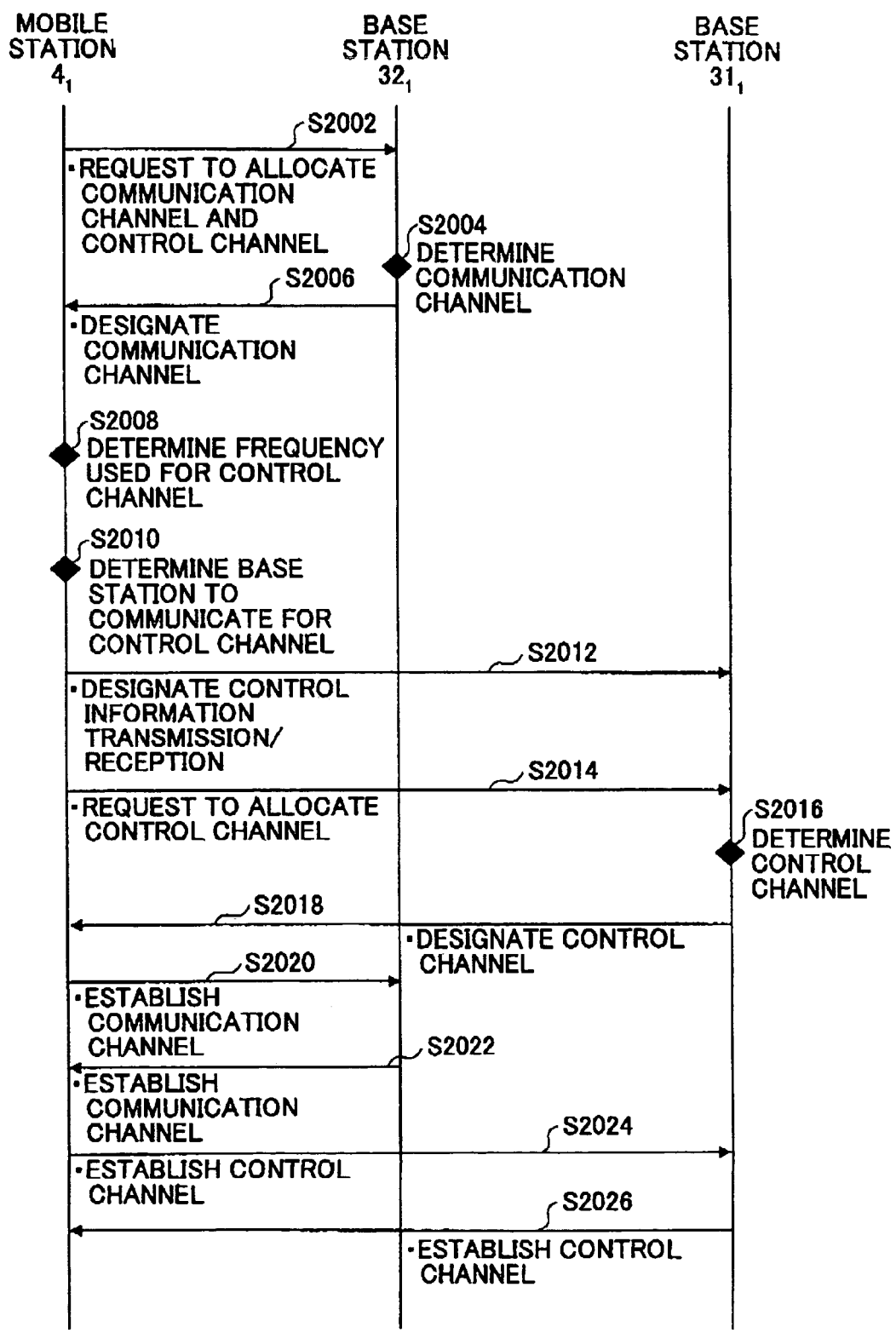
FIG. 20 is a sequence chart illustrating control sequence in a multi-band mobile communication system according to one embodiment of the present invention.

A control sequence is explained with reference to FIG. 20.

After a call is generated, the system must determine a radio communication channel that transmits user information and a radio control channel that transmits control information for establishing, maintaining and managing communication for the call. The mobile station $4_1$ that has generated the call makes a request to allocate a radio communication channel and a radio control channel to base station $32_1$ at step S2002.

In response to this request, the base station $32_1$ determines a radio communication channel using its own system frequency band 22 at step S2004. The base station $32_1$ notifies (at step S2006) the mobile station $4_1$ of the communication channel determined at step S2004.

The mobile station $4_1$ determines (step 2008) a frequency band (for example the frequency band 21) to be used in the radio control channel in consideration of conditions required for the control information in the communication and the propagation characteristics of each frequency, and determines a control information transmitting/receiving base station (for example, the base station $31_1$) for transmitting control information to the mobile station $4_1$ using the determined frequency band, at step S1810. The mobile station $4_1$ notifies the base station $31_1$ of the frequency band used for the control channel and the control information transmitting/receiving base station at steps S2012. The mobile station makes a request to the base station $31_1$ to allocate a radio control channel.

The base station $31_1$ determines a radio control channel using its own system frequency band 21 at step S2016, and designates the control channel to the mobile station $4_1$, at step S2018.

Next, the determined communication channel is established between the mobile station $4_1$ and the base station $32_1$ at steps S2020, S2022. The determined control channel is established between the mobile station $4_1$ and the base station $31_1$ at steps S2024, S2026. In this manner, the transmission of the user information and the control information starts.

In this embodiment, the mobile station can designate a frequency band to be used for the control channel.

In the multi-band radio communication system according to the embodiments of the present invention, it is possible to realize effective use of frequency resource, reliable service are availability, improved control quality, that is high quality transmission and highly accurate control, in consideration of the propagation characteristics of each frequency and the conditions required for the control information for establishing, maintaining and managing generated call's communication.

In the above explained embodiments, three cellular systems are established. The present invention, however, can be applied to two or more cellular systems that are established in the same area.

INDUSTRIAL APPLICABILITY

Frequency selection devices, radio communication systems and radio control channel establishing methods according to the present invention can be applied to multi-band radio communication systems whose services are provided to the same area using different frequency bands.

The present application is based on Japanese Priority Application No. 2004-174739 filed on Jun. 11, 2004 with the Japanese Patent Office, the entire contents of which are hereby incorporated by reference.

What is claimed is:

1. A radio frequency selection device of a radio communication system for use in an environment in which plural radio communication systems are established in a same area, the radio frequency selection device having a second radio communication channel established in a second allocated frequency band of a second radio communication system, between a mobile station and a base station, the second allocated frequency band being different and nonoverlapping with respect to others of the plural radio communication systems, comprising:
   a frequency band determining unit configured to determine a second radio control channel frequency band, for transmitting control information based on the second allocated frequency band of the established second radio communication channel, from the plurality of different, nonoverlapping frequency bands available to the plural radio communication systems; and
   a radio control channel establishing unit configured to establish a second radio control channel within the second determined radio control channel frequency band, the second determined radio control channel frequency band being lower than and apart from in frequency, the second allocated frequency band of the established second radio communication channel, and the second determined radio control channel frequency band being in a first frequency band allocated to a first radio communication system lower than and apart from the established second radio communication channel of the second radio communication system.

2. The radio frequency selection device as claimed in claim 1, wherein, the frequency band determining unit determines a radio control channel frequency band, based on at least one of types of control information, control information amount, desired quality of control information, control accuracy, information regarding a radio communication channel frequency channel, information on each of the plural radio communication systems, frequency availability, and propagation characteristics of frequency bands of the plural radio communication systems.

3. The radio frequency selection device as claimed in claim 1, further comprising:
   a control information classifying unit configured to classify the control information by control subject and purpose;
   wherein the frequency band determining unit determines a radio control channel frequency band of the plural systems for each classified control information item.

4. The radio frequency selection device as claimed in claim 1, wherein, the frequency band determining unit determines a frequency band for an uplink radio control channel, from the plurality of different, nonoverlapping frequency bands that are lower frequency bands with respect to a frequency band for a downlink radio communication channel.

5. The radio frequency selection device as claimed in claim 1, further comprising:
   a base station designator configured to designate a base station among plural base stations in the radio communication systems capable of using the radio control channel frequency band.

6. The radio frequency selection device as claimed in claim 5, wherein, the radio control channel establishing unit establishes a radio control channel, based on a designation of another radio communication system.

7. A radio communication system for use in an environment in which radio communication systems are established in a same area, the radio communication system having a second radio communication channel established in a second allocated frequency band of a second radio communication system, between a mobile station and a base station, the second allocated frequency band being different and non-overlapping with respect to the others of the plural radio communication systems, comprising:
   a frequency band determining unit configured to determine a second radio control channel frequency band, for transmitting control information based on the second allocated frequency band of the established second radio communication channel, from the plurality of different, nonoverlapping frequency bands available to the plural radio communication systems; and
   a radio control channel establishing unit configured to establish a second radio control channel within the second determined radio control channel frequency band, the second determined radio control channel frequency band being lower than and apart from in frequency, the second allocated frequency band of the established second radio communication channel, and the second determined radio control channel frequency band being in a first frequency band allocated to a first radio communication system lower than and apart from the established second radio communication channel of the second radio communication system.

8. A radio control channel establishing method in a radio communication system for use in an environment in which plural radio communications systems are established in a same area, the radio communication system having a second radio communication channel established in a second allocated frequency band of a second radio communication system between a mobile station and a base station, the second allocated frequency band being different and non-overlapping with respect to others of the plural radio communications systems, comprising:
   determining a radio communication channel between the mobile station and the base station;
   determining a second radio control channel frequency band for transmitting control information based on the second allocated frequency band of the established second radio communication channel, from the plurality of different, nonoverlapping frequency bands available to the plural radio communication systems, and establishing a second radio control channel within the second determined radio control channel frequency band, the second determined radio control channel frequency band being lower than and apart from in frequency, the second allocated frequency band of the established second radio communication channel, and the second determined radio control channel frequency band being in a first frequency band allocated to a first radio communication system lower than and apart from the established second radio communication channel of the second radio communication system.

* * * * *